(12) United States Patent
Maeda et al.

(10) Patent No.: US 12,390,897 B2
(45) Date of Patent: Aug. 19, 2025

(54) SPIRAL CONVEYOR AND FILTER UNIT

(71) Applicant: TOKYO SEIMITSU HATSUJO CO LTD., Yokohama (JP)

(72) Inventors: Takaaki Maeda, Yokohama (JP); Yoshio Watanuki, Yokohama (JP)

(73) Assignee: TOKYO SEIMITSU HATSUJO CO LTD., Yokohama (JP)

( * ) Notice: Subject to any disclaimer, the term of this patent is extended or adjusted under 35 U.S.C. 154(b) by 135 days.

(21) Appl. No.: 18/043,970

(22) PCT Filed: May 24, 2021

(86) PCT No.: PCT/JP2021/019573
§ 371 (c)(1),
(2) Date: Mar. 3, 2023

(87) PCT Pub. No.: WO2022/059258
PCT Pub. Date: Mar. 24, 2022

(65) Prior Publication Data
US 2023/0356343 A1    Nov. 9, 2023

(30) Foreign Application Priority Data
Sep. 17, 2020   (JP) ................................. 2020-156313

(51) Int. Cl.
*B65G 33/14*     (2006.01)
*B23Q 11/00*     (2006.01)
(Continued)

(52) U.S. Cl.
CPC ...... *B23Q 11/1069* (2013.01); *B23Q 11/0067* (2013.01); *B65G 33/14* (2013.01);
(Continued)

(58) Field of Classification Search
CPC .... B65G 33/14; B65G 33/24; B23Q 11/0067; B23Q 11/1069
(Continued)

(56) References Cited

U.S. PATENT DOCUMENTS 5,564,555 A * 10/1996 Doi ...................... B65G 45/005
  198/495
5,636,580 A * 6/1997 Kanis ........................ C10B 7/10
  110/255
(Continued)

FOREIGN PATENT DOCUMENTS

JP     118709/1981    9/1981
JP     9-201739 A     8/1997
(Continued)

OTHER PUBLICATIONS

International Search Report from PCT/JP2021/019573 dated Jun. 29, 2021, 5 pgs.

*Primary Examiner* — Douglas A Hess
(74) *Attorney, Agent, or Firm* — Tutunjian & Bitetto, P.C (57) ABSTRACT

A filter unit is connected between a tray and a discharging duct of a spiral conveyor. The filter unit includes a first filter (perforated metal) that is fixed at a position close to the outer periphery of a conveying spiral, and a second filter (mesh filter) that rotates on the outside of the conveying spiral and the first filter. A washing nozzle sprays a washing liquid on the second filter. The chips captured by the first filter are scraped by the rotating conveying spiral and delivered back to the conveying path and the chips passing through the first filter but captured by the second filter are removed by the washing nozzle and delivered back to the conveying path. The washing liquid is sprayed at a predetermined angle from the washing nozzle and collides with vanes arranged on the outer periphery of the second filter and provides rotational force on the second filter.

7 Claims, 6 Drawing Sheets

(51) Int. Cl.
  *B23Q 11/10* (2006.01)
  *B65G 33/24* (2006.01)
(52) U.S. Cl.
  CPC .......... *B65G 33/24* (2013.01); *B65G 2201/04* (2013.01); *B65G 2812/0577* (2013.01)
(58) Field of Classification Search
  USPC ........................................................ 198/657
  See application file for complete search history.

(56) References Cited

U.S. PATENT DOCUMENTS

| | | | | |
|---|---|---|---|---|
| 6,808,354 | B1 * | 10/2004 | Kulbeth | B65G 33/10 |
| | | | | 414/326 |
| 6,976,819 | B2 * | 12/2005 | Kulbeth | B65G 65/46 |
| | | | | 414/326 |
| 8,875,871 | B2 * | 11/2014 | Iwata | B65G 37/00 |
| | | | | 198/542 |
| 9,561,909 | B2 * | 2/2017 | Van Der Woning | B65G 33/14 |
| 10,844,881 | B2 * | 11/2020 | Fange-Larsen | B24C 5/02 |
| 2015/0001056 | A1 * | 1/2015 | Shimizu et al. | |

FOREIGN PATENT DOCUMENTS

| | | | | |
|---|---|---|---|---|
| JP | | 3228029 B2 | 11/2001 | |
| JP | | 5433823 B2 | 3/2014 | |
| JP | | 2020-171988 A | 10/2020 | |
| WO | WO-2023053695 A1 * | | 4/2023 | ............. B29B 17/02 |

\* cited by examiner

SPIRAL CONVEYOR AND FILTER UNIT

FIELD OF ART

The present invention relates to a spiral conveyor suitable for conveyance of chips or scrapes which are generated in the course of metal cutting process, and also to a filter unit attachable to the spiral conveyor.

BACKGROUND ART

Figure 5:
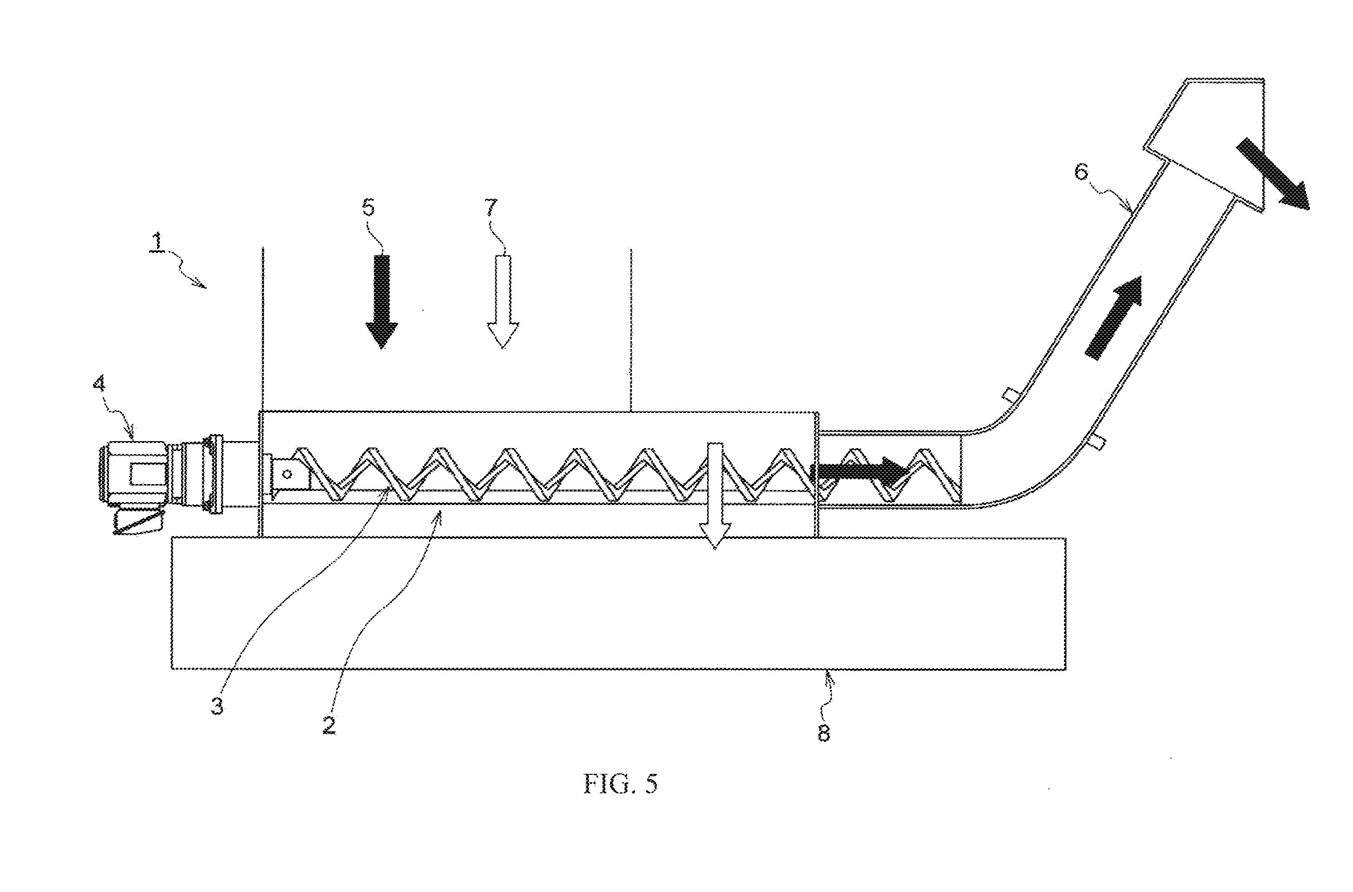
FIG. 5 an overall side view of a conventional spiral conveyor.

A spiral conveyor 1, which has been known as a kind of conveyors, is shown by way of example in Patent Document 1, in Non-Patent Document 1 and FIG. 5, wherein a conveyance spiral 3 like a coil spring is received in a tray 2 and driven by a motor 4 with a decelerator to be rotated at a low speed in a predetermined direction, thereby conveying chips 5, which have been thrown into the tray 2, in a predetermined direction within the tray 2, and then discharged toward a discharge duct 6 connected to an exit of the tray 2. Cutting fluid 7 is thrown into the tray 2 together with chips 5, which will fall down into a cutting fluid tank 8 positioned beneath the tray 2, while being conveyed within the tray 2.

Such spiral conveyor having the above-described construction has been widely used in various machine tools, because it is capable of smoothly conveying chips of various shapes, sizes and materials, from largely-expanded long-chain-shaped continuous chips or scrapes to needle-like fine chips or scrapes, it has a simple structure and can be manufactured and provided at a low cost, it will achieve long-distance conveyance of the chips or scrapes in a machining process wherein various machine tools are connected to each other, it is possible to efficiently separate and collect the cutting fluid which has been adhered to the chips or scrapes, etc.

PRIOR ARTS

Patent Documents

Patent Document 1: Japanese Patent Publication No. 2018-001400A

Non-Patent Documents

Non-Patent Document 1: http://www.to-hatsu.co.jp/products/sc_built.html Summary of Invention

Problems to be Solved by Invention

Figure 6:
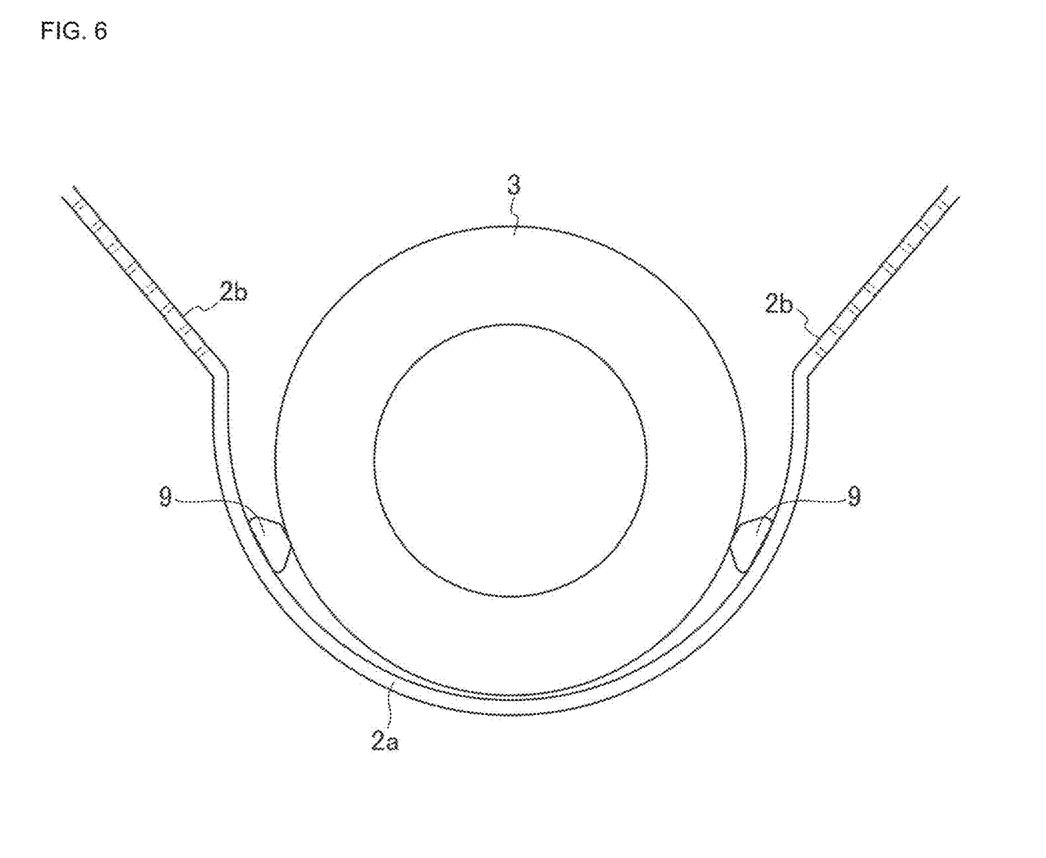
FIG. 6 a cross-section of the prior art spiral conveyor taken along B-B line in FIG. 5.

The conventional spiral conveyor 1 has a tray 2 having a shape such as shown in FIG. 6. More particularly, the tray 2 has a curved bottom section 2a for receiving the conveyance spiral 3 and a pair of slanting sections 2b, 2b extending in obliquely upward directions from the opposite ends of the curved bottom portion. The slanting sections 2b, 2b will act as guide plates so that the chips or scrapes 5 falling down onto the said sections may be smoothly transferred by their own weights toward the conveyance section of the conveyance spiral 3. When they are made of perforated metal plates, they will also act as filters. The cutting fluid 7 will fall down through the perforations of the metal plate to be collected in the cutting fluid tank 8.

However, such conventional filter will likely be clogged. Especially, when chips or scrapes 5 of relatively lightweight aluminum material should fall onto the slanting sections 2b, 2b, they could not easily be moved by their own weights toward the conveyance section, which would rather tend to be accumulated thereat to cause clogging.

Accordingly, in view of the above-described backgrounds, the problem to be solved by the present invention is to provide a spiral conveyor with a filter which is capable of preventing clogging irrespective of material and shape of chips or scrapes to be processed. Another problem to be solved by the present invention is to provide a filter unite which is easily retro-attachable to an existing spiral conveyor.

Means for Solving the Problems

To solve the above-described problems, according to an embodiment of the present invention, there is provided a spiral conveyor having a tray into which chips or scrapes discharged from a cutting machine are thrown together with cutting fluid, a discharge duct for discharging the chips or scrapes, a filter unit connected between the tray and the discharge duct, a conveyance spiral mounted within the tray and the filter unit and driven in a predetermined direction for conveying the chips or scrapes in a predetermined direction, and a cutting fluid tank for receiving the cutting fluid falling down from the tray and the filter unit, characterized in that the filter unit comprises a primary filter fixed at position close to an outer periphery of the conveyance spiral, a secondary filter rotating on the outside of the conveyance spiral and the primary filter, and a washing nozzle for spraying washing liquid onto the secondary filter, wherein the chips or scrapes captured by the primary filter is scraped by the rotating conveyance spiral and delivered back to a conveyance path, whereas the chips or scrapes passing through the primary filter and captured by the secondary filter is removed by the washing nozzles and delivered back to the conveyance path.

According to another embodiment of the present invention, the primary filter has a more rough texture than the secondary filter.

According to another embodiment of the present invention, the primary filter comprises a perforated metal and the secondary filter comprises a net of 100-200 mesh.

According to another embodiment of the present invention, the primary filter comprises a pair of filters arranged in opposite sides of the conveyance spiral with small gaps between the filter member and the outer periphery of the conveyance spiral.

According to another embodiment of the present invention, the secondary filter includes plural filter members secured to a ring-shaped rotating disc and free-rotating rollers are positioned in contact with an inner periphery of the rotating disc, so that the secondary filter becomes rotatable.

According to another embodiment of the present invention, one or more vanes are provided on an outer periphery of the secondary filter for receiving the washing liquid sprayed from the washing nozzles to rotate the secondary filter in a predetermined direction.

According to another embodiment of the present invention, the washing nozzles are arranged substantially just above the secondary filter to spray the washing liquid toward a top of the secondary filter in an obliquely downward direction.

According to another embodiment of the present invention, the filter unit is mounted continuously and integrally with an exit of the tray.

According to another embodiment of the present invention, the filter unit is an independent unit mounted between an exit of the tray and an entrance of the discharge duct.

Advantages of Invention

In accordance with claim 1 of the present invention, the filter unit including combination of the primary filter and the secondary filter is connected between the tray and the discharge duct, so that chips or scrapes thrown into the tray can be smoothly conveyed toward the discharge duct by the conveyance spiral, while preventing clogging of the chips or scrapes to the filter. The chips or scrapes captured by the primary filter is scraped by the rotating conveyance spiral to be back to the conveyance path, whereas the chips or scrapes passing through the primary filter and captured by the secondary filter is removed by the washing nozzles to be back to the conveyance path, without being clogged.

In accordance with claim 2 of the present invention, among chips or scrapes thrown into the tray, relatively larger size chips or scrapes that cannot pass through the primary filter will be captured by the primary filter, and relatively smaller size chips or scrapes that can pass through the primary filter will be captured by the secondary filter, so that the chips or scrapes may be sieved sequentially according to their sizes.

In accordance with claim 3 of the present invention, suitable materials for the primary filter and the secondary filter are provided. Both the perforated metal and the mesh filter are widely put on the market and easily available at low prices.

In accordance with claim 4 of the present invention, a suitable design for the primary filter is provided. The two filter members arranged in opposite sides of the conveyance spiral with small gaps thereto may be upstanding ones at said positions (see FIG. 3) or arcuate ones extending along the outer periphery of the conveyance spiral (see FIG. 4).

In accordance with claim 5 of the present invention, a suitable design for the secondary filter rotatable is provided. The ring-shaped rotating disc is rotatably supported by the free-rotating rollers engaging the inner periphery thereof, so that the secondary filter secured to the rotating disc will rotate theretogether.

In accordance with claim 6 of the present invention, a suitable design for rotating the secondary filter is provided. The secondary filter will automatically rotate by a rotational energy obtainable by the vanes on the outer periphery thereof onto which the washing liquid from the washing nozzle is sprayed, which will require no drive source for rotation such as motor.

In accordance with claim 7 of the present invention, the washing liquid is sprayed in an obliquely downward direction from the washing nozzles positioned substantially just above the secondary filter onto the top of the secondary filter, which makes it possible to rotate the secondary filter in a predetermined direction that depends on the spraying direction. Furthermore, the relatively smaller size chips or scrapes captured by the secondary filter may be smoothly removed therefrom to fall down by the washing liquid sprayed from the washing nozzles and also by their own weight, which will achieve more improved effect of clogging prevention.

In accordance with one embodiment of the present invention, the filter unit is mounted continuously and integrally with the exit of the tray, which will be well applicable when newly manufacturing a spiral conveyor coupled in advance with the filter unit.

In accordance with another embodiment of the present invention, the filter unit may be afterward incorporated to the existing spiral conveyor (FIG. 5) of conventional design wherein the discharge duct is connected to the exit of the tray, which may impart an additional value to the existing spiral conveyor.

EMBODIMENTS OF INVENTION

A spiral conveyor and a filter unit according to the present invention will be described in detail by reference to embodiments.

Embodiment 1

A spiral conveyor according to an embodiment (Embodiment 1) of the present invention will be described in reference to FIGS. 1 to 5. This spiral conveyor 10 has the same basic structure as that of the spiral conveyor 1 of FIG. 5 and its basic operation and function is also the same as those having been described in connection with FIG. 5, so that the members and elements identical or corresponding to those in the spiral conveyor of FIG. 5 are shown by the same reference numerals. However, this spiral conveyor is significantly different from the prior art one in that a filter unit 20 is arranged between the tray 2 and the discharge duct 6. The conveyance spiral 3 extends through the tray 2 and the filter unit 20 to a halfway position (that is, a horizontal section adjacent to the filter unit 20) of the discharge duct 6. An extension tray 21 is connected to the tray 2 to extend through the filter unit 20.

The filter unit 20 shown in this embodiment is installed between the tray 2 and the discharge duct 6 by using a tray-side attachment plate 22 secured at the exit end of the tray 2 by bolt or the like to a cover plate (not shown) extending in a widthwise direction (that is a direction orthogonal to the sheet of FIG. 1) to partially close the open surface of the cutting fluid tank 8, and a duct-side attachment plate 23 secured at the inlet end of the discharge duct 6 by bolt of the like to the cover plate of the liquid fluid tank 8.

Figure 1:
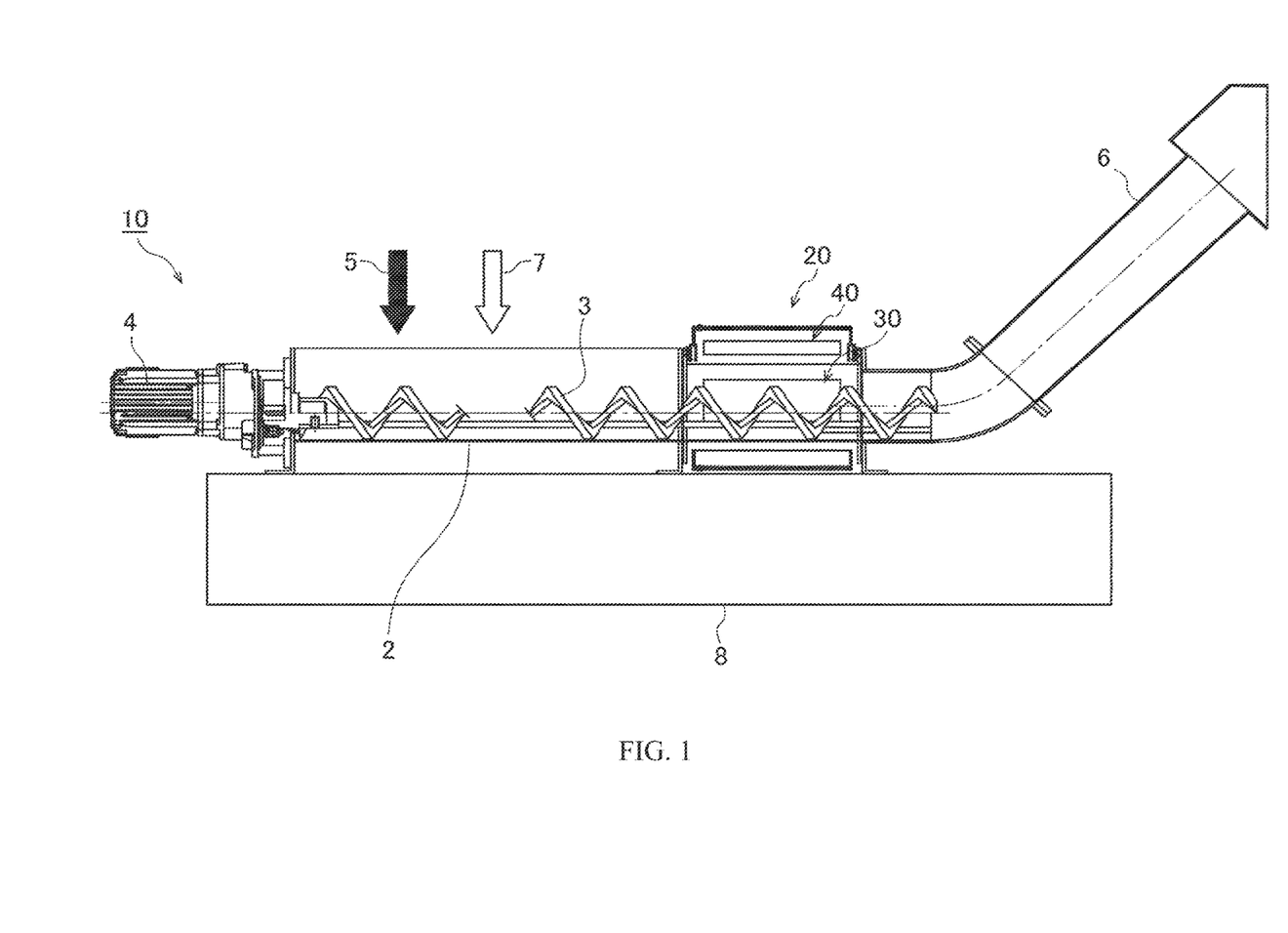
FIG. 1 an overall side view of a spiral conveyor according to an embodiment (Embodiment 1) of the present invention.
Figure 2:
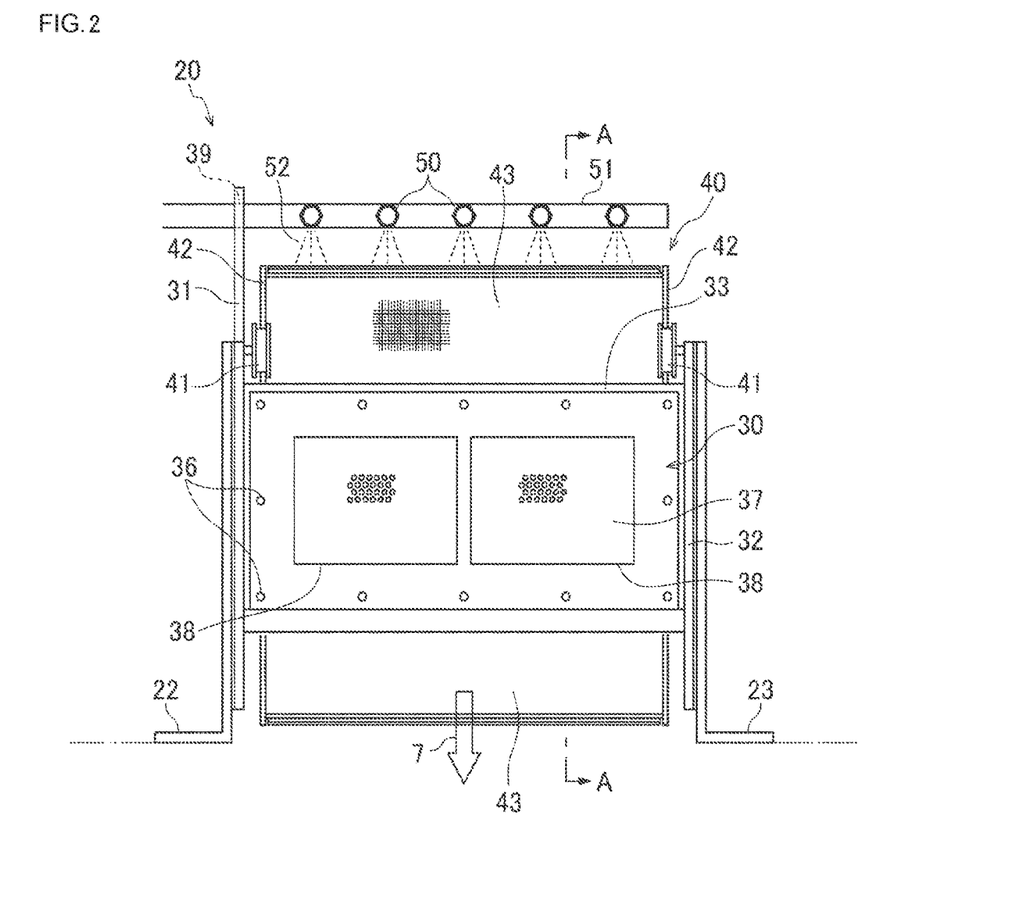
FIG. 2 a side view of a filter unit mounted between a tray and a discharge duct in this spiral conveyor, wherein illustration of a secondary filter positioned in the front side is omitted.
Figure 3:
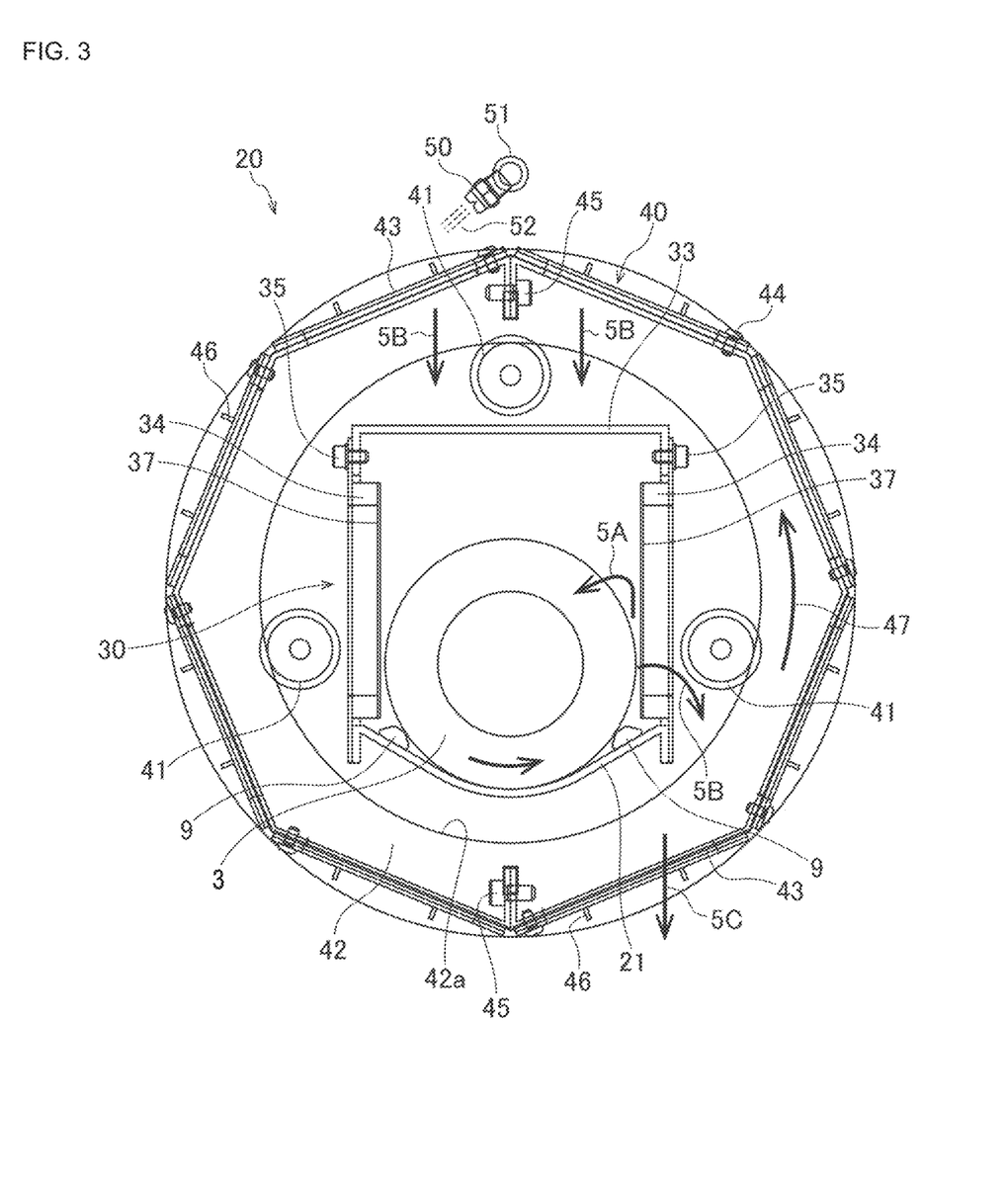
FIG. 3 a cross-section of this filter unit taken along A-A line in FIG. 2.

Between the tray-side attachment plate 22 and the duct-side attachment plate 23 is installed a primary filter structure 30. In this embodiment, the primary filter structure 30 comprises a tray-side vertical plate 31 (having a height larger than a duct-side vertical plate 32) secured by bolts (not shown) to the inner wall of the tray-side attachment plate 23, a duct-side vertical plate 32 secured by bolts (not shown) to the inner wall of the duct-side attachment plate 22, a filter frame 33 of a U-shaped cross-section welded to these vertical plates like a bridge therebetween, and perforated metal plates 37 secured by bolts 35 (only bolts 35 for securing the upper ends are shown in FIG. 3, whereas, in FIG. 2, bolts 35 are not shown but through-holes 36 for passing the bolts 35 therethrough are shown) to the inside of the filter frame 33 with spacers 34 therebetween.

The side wall of the filter frame 33 has a large central opening, so that relatively smaller chips or scrapes (such as sludge) which have passed through the perforated metal plate 37 may smoothly move toward the outside of the filter frame 33. Although each side wall of the filter frame 33 has a pair of openings 38 arranged in a row in this embodiment, these openings may be connected to form an integral opening 38. The shape of the opening will not be limited to a rectangle, which may also be a circle or ellipse, for example.

The perforated metal plate 37 has external shape and dimension almost identical to the side wall of the filter frame 33, which is secured to the inner wall of the peripheral portions of the filter frame 33 by the bolts 35, as described above. In this fixed condition, a pair of the perforated metal plates stand upright at opposite positions, while giving small gaps in the direction of conveyance at opposite sides of the conveyance spiral 33 extending through the interior of the filter unit 20 (FIG. 3). By way of example, the perforated metal sheet 37 may be made by a stainless steel plate having a large number of circular perforations of 3 mm diameter at each 5 mm interval on the almost entire surface area thereof. However, the interval, diameter, shape and the like of the perforations will be designed depending upon the size and shape of the chips or scrapes 5 to be conveyed. The shape of the perforations is not limited to a circle, which may also be a slotted hole or slit, for example.

A secondary filter structure 40 is arranged to surround the conveyance zone including the extension tray 21 and the primary filter structure 30. In this embodiment, the secondary filter structure 40 comprises three free rollers 41 freely rotating around a shaft (with no reference numeral) fixed at positions of 120-degree angles with respect to the tray-side vertical plate 31 and the duct-side vertical plate 32 of the primary filter structure 30, ring-shaped rotary plates 42 (a pair of front and rear ones) each having an inner periphery supported by these free rollers 41, and a substantially cylindrical mesh filter 43 fitted to and between the front and rear rotary plates 42, 42.

In this embodiment, four mesh filters 43 are connected in serial with each other at 144-degree angles by screws 44 to form a semi-circular filter, and a pair of the semi-circular filters are connected by bolts 45 to form a mesh filter unit 43 of a regular-octagonal cross-section. This is only a non-limited example. A single mesh filter member may be used to form a cylindrical mesh filter unit 43. Another polygon other than octagon is also applicable.

The mesh filter 43 has more fine texture than the perforated metal 37 of the primary filter structure 30. By way of example, a stainless mesh filter of 100-200 mesh (75-150 micrometers) may be used. Vanes 46 are fitted to the outer periphery of the mesh filter 43 at suitable positions thereof and at suitable intervals between one another. The cleaning liquid jetted from cleaning nozzles, described later, will collide with the vanes to thereby rotate the rotary plate 42.

The washing nozzles 50 are arranged substantially just above the secondary filter structure 40. The washing nozzles 50 are connected to a washing fluid pipe 51 extending through a through hole 39 which is formed in vicinity to the upper end of the tray-side vertical plate 31 higher than the filter frame 33 in the first filter structure 30, so that the washing liquid 52 supplied through the washing liquid pipe 51 will be sprayed toward the mesh filter 43 positioned in the uppermost position of the secondary filter structure 40 in a predetermined direction. The cutting fluid 7 collected in the cutting fluid tank 8 may be reused as the washing liquid 52, wherein a circulation pathway may be formed to pump up the cutting fluid to the washing fluid pipe 51.

The operation and function of the above-described filter unit 20 will now be explained. The chips or scrapes 5 that have been thrown into the tray 2 together with the cutting fluid 7 will be conveyed in a rightward direction in FIG. 1 by the conveyance spiral 3. The cutting fluid 7 is separated during conveyance and falls down into the cutting fluid tank 8 for collection. When the chips or scrapes is transferred to the exit of the tray 2 and then into the filter unit 20, they will be processed by the perforated metal plates 37 of the primary filter structure 30 and then by the mesh filter 43 of the secondary filter structure 40.

More particularly, the chips or scrapes 5 which have been transferred into the filter unit 20 while being coiled around the conveyance spiral 3 will become in touch with the perforated metal plate 37 arranged with a small gap to the outer periphery of the conveyance spiral 3. The relatively larger chips or scrapes 5A cannot pass through the mesh openings of the perforated metal plate 37 and therefore forcibly scraped by the rotating conveyance spiral which becomes in contact with the perforated metal plate 37, so that they will be moved back to the inside of the conveyance path and conveyed again by the conveyance spiral 3 toward the discharge duct 6. The relatively smaller chips or scrapes 5B (such as sludge) can pass through the perforated metal plate 37 to be thrown to the outside of the primary filter structure 30.

The relatively smaller chips or scrapes 5B which have been thrown to the outside of the primary filter structure 30 will then be processed by the mesh filters 43 of the secondary filter structure 40 arranged outside of the primary filter structure 30.

Thus, the relatively smaller chips or scrapes 5B which have passed through the perforated metal plate 37 will fall by their own weights so that they will be subjected to solid-liquid separation by the lower-positioned mesh filter 43. The cutting fluid 7 adhered to the chips or scrapes 5B can be separated here to be collected in the below-positioned cutting fluid tank 8.

In the meantime, the relatively larger chips or scrapes 5B which cannot pass through the mesh filters 43 will be captured by the lower-positioned mesh filter 43. The rotary plates 42 and the mesh filters 47 in the secondary filter structure 40 are driven by collision of the washing fluid from the washing nozzles 50 with the vane 46 on the outer periphery of the uppermost-positioned mesh filter 43 to always rotate in the predetermined direction (that is a counter-clockwise direction, because the washing fluid 52 is injected from the washing nozzles 50 in the obliquely right-downward direction in FIG. 3). By this rotation, the lower-positioned mesh filter (where the relatively smaller chips or scrapes 5B is captured) will be moved to the above little by little. As shown by the arrow 5B in FIG. 3, some of the relatively smaller chips or scrapes 5B captured by the said mesh filter will fall down by their own weights during ascending movement thereof. The chips or scrapes 5B which have failed to fall dawn by their own weights should be subjected to the washing fluid 52 injected from the washing nozzles 50 when the said mesh filter 43 reaches the uppermost position, they will be separated from the said mesh filter to fall down by their own weights and thus conveyed further by the conveyance spiral 3 toward the discharge duct 6.

As described above, among the chips or scrapes 5 coiled around the conveyance spiral 3, the relatively larger chips or scrapes 5A cannot pass the perforated metal plate 37 of the primary filter structure 30 and should be scraped or removed therefrom to be separated from the conveyance spiral 3, which will be again returned to the conveyance path by the conveyance spiral 3. On the other hand, the relatively smaller chips or scrapes 5B passing through the perforated metal plate 37 of the primary filter structure 30 will be caught by the mesh filter 43 of the secondary filter structure 40 and then separated therefrom to fall down during ascending movement of the said mesh filter, which will be again returned to the conveyance path by the conveyance spiral 3. Accordingly, both the relatively larger chips or scrapes 5A and the relatively smaller chips or scrapes 5B can be conveyed toward the discharge duct 6 without causing serious clogging.

In addition, the perforated metal plates 37 of the primary filter structure 30 stand at position in close vicinity to the outer periphery of the conveyance spiral 3. Accordingly, even if the metal plate should be clogged with the chips or scrapes 5A, they will soon become in touch with the outer periphery of the conveyance spiral 3 and removed thereby to fall down. This means that a temporal clogging can soon be cancelled, even if it occurs. Further, the mesh filters 43 of the secondary filter structure 40 will always be rotating, and one of the mesh filter reaching the uppermost position will be washed by the washing liquid 52 from the washing nozzles 50. Therefore, the relatively smaller chips or scrapes 5B captured by the mesh filter 43 could be removed therefrom during half-rotation or less to cancel clogging. Accordingly, both the perforated metal plates 37 and the mesh filters 43 will not be faced with serious clogging.

Embodiment 2

Figure 4:
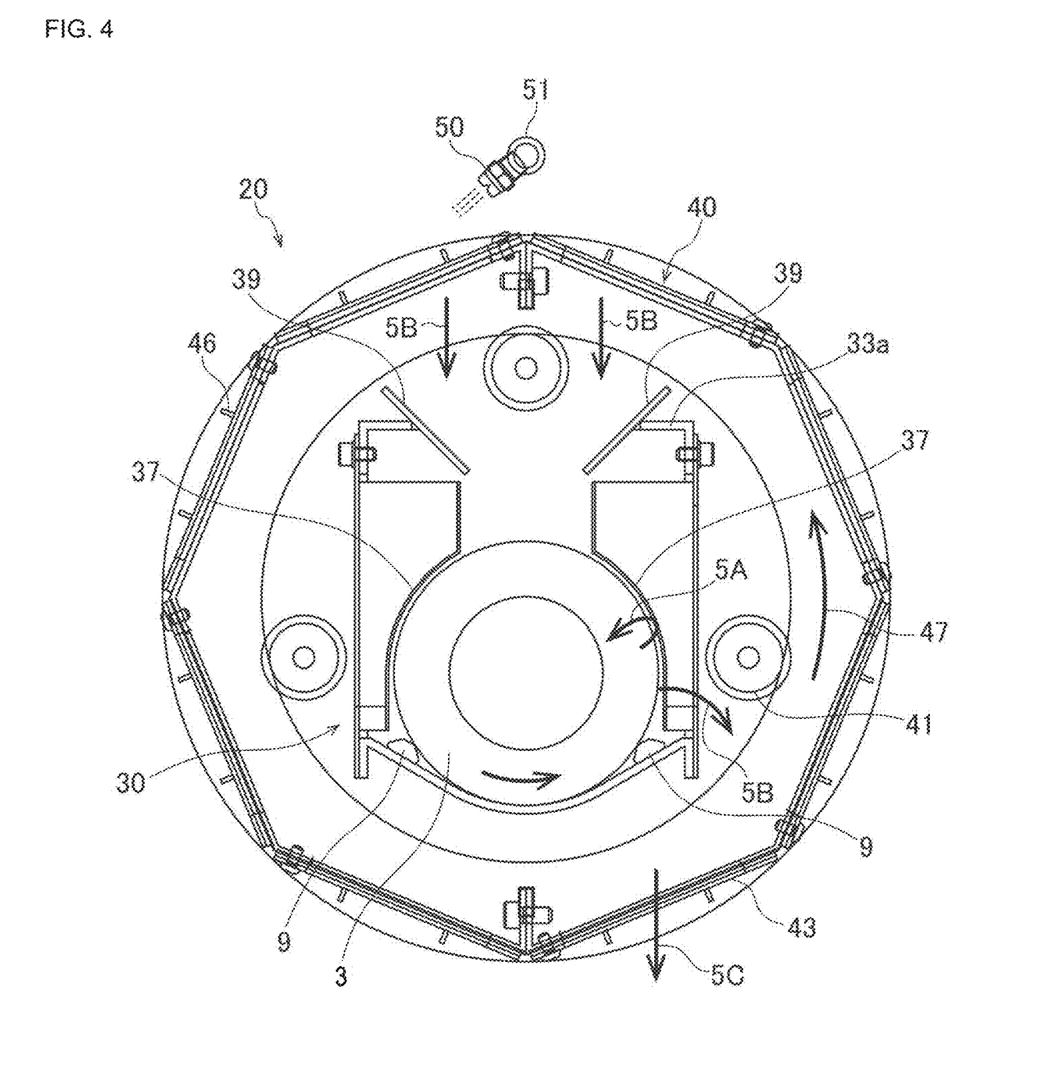
FIG. 4 a cross-section of a filter unit according to another embodiment (Embodiment 2) of the present invention, which is illustrated in the same manner as in FIG. 3.

A filter unit 20 according to another embodiment (Embodiment 2) of the present invention will be described in reference to FIG. 4. This filter unit 20 has a primary filter structure 30 of a partly different design from the filter unit 20 of Embodiment 1. More specifically, there are two differences, one is that the perforated metal plate 37 has an arcuate section over a predetermined length along the outer peripheral of the conveyance spiral 3, and the other is that a top plate 33a of the filter frame 33 has a wide opening at the center, and inclined or funnel-shaped guide plates 39 are formed at the edges of the opening.

The former difference will contribute to elongation of an area where the relatively longer chips or scrapes 5A entangled with the rotating conveyance spiral 3 could become in touch with the perforated metal plate 37 and thus separated therefrom, and also to improvement of prevention of clogging of the perforated metal plate 37. The latter difference will make it possible to more smoothly return the relatively smaller chips or scrapes 5B captured by the mesh filter 43 of the secondary filter structure 40, to the conveyance path by the conveyance spiral 3, when they fall down during ascending movement of the said mesh filter 43.

Apart from these differences, the filter unit of this embodiment is substantially the same with the filter unit 20 of Embodiment 1 and explanation thereof will be omitted. In FIG. 4, the members or elements identical or corresponding to those in the filter unit 20 of Embodiment 1 are shown by the same reference numerals, but some members or elements are shown by omission of their reference numerals.

Although the present invention has been described in detail in reference to the embodiments illustrated in the drawings, it is not limited thereto and may be implemented in various modifications and applications within a scope of the invention to be interpreted based on the appended claims.

For example, although the spiral conveyor 10 having a hollow conveyance spiral 3 with no central axis is shown in the illustrated embodiments, the present invention will be applicable also to another type spiral conveyor having a conveyance spiral with a central axis.

Furthermore, although the spiral conveyor 10 shown in the illustrated embodiments is designed such that the discharge duct 6 is connected to the exit of the filter unit 20 so that the chips or scrapes 5 are conveyed in an obliquely upward direction, the present invention will also be applicable to another type spiral conveyor having no discharge duct (or a lift-up duct).

Furthermore, although the spiral conveyor 10 in the illustrated embodiments (and the conventional spiral conveyor 1 of FIG. 6) is shown as a type where projecting rails 9, 9 are formed at opposite positions on the inner walls of the curved bottom sections of the tray 2 and the extension tray 21 to extend over the entire length, the spiral conveyor may be of a rail-less type having no rails 9, 9 so that the conveyance spiral 3 is in direct contact with a small area extending in a crosswise direction along the lowermost points of the trays 2, 21. When the rail type is employed, the conveyance spiral 3 is supported on the rails 9, 9 while usually being floated to leave a small gap (of the order of 1 mm, for example) from the lowermost points of the trays 2, 21 (see FIG. 6, no gap is shown in FIGS. 3 and 4). In other embodiment, the conveyance spiral is in contact with some area including the uppermost point of the trays to leave a small gap (of less than 1 mm, for example) from the trays 2, 21. Means for supporting the conveyance spiral 3 is not directly related to the subject matters of the present invention and, therefore, any supporting means will be applicable to the present invention.

Furthermore, as taught in Patent Document 1, the tray 2 of the spiral conveyor may comprise an outer tray and an inner tray with vibration dampening material interposed therebetween, which will also be applicable to the present invention for achieving vibration dampening effect.

Furthermore, in the illustrated embodiments, the cutting fluid 7 is used as the washing fluid, which is injected from the washing nozzles 50 to the secondary filter (or the mesh filter 43) for eliminating clogging. In another embodiment, air may be injected from the washing nozzles 50.

Furthermore, in the illustrated embodiments, the washing fluid is injected from the washing nozzles 50 in the obliquely right-downward direction toward the secondary filter (or the mesh filter 43), which will collide against the vanes 46 to rotate the secondary filter. This makes it possible to rotate the secondary filter with no need to use any rotation drive means such as motor, which will provide advantages of simplifying, down-sizing and cost-down of the device. However, the washing nozzles 55 may inject the washing liquid just in a downward direction. This will require some rotation drive means for rotating the secondary filter, but the vanes may be omitted. In addition, this will provide more improved effect of separating and removing the relatively smaller chips or scrapes 5B from the secondary filter.

The present invention is characterized in that the filter unit 20 is connected between the tray 2 and the discharge duct 6 in the spiral conveyor 10. The filter unit 20 may be incorporated when newly manufacturing the spiral conveyor 10. Alternatively, the filter unit 20 may be afterward incorporated to the existing spiral conveyor (FIG. 5) of conventional design wherein the discharge duct 6 is connected to the exit of the tray 2. In this case, in order to prevent the disadvantage relating to the prior art (that is, chips or scrapes 5 may tend to be clogged on the slanting sections 2b, 2b of the tray 2), some design changes should preferably be applied. For example, perforations of the metal plate forming the slanting sections 2b, 2b may be closed, or the perforated metal plate is replaced with a solid plate with no perforation, which is used to form the slanting section having greater inclination.

LEGENDS 1 spiral conveyor
2 tray
3 conveyance spiral
4 motor with deceleration mechanism
chips or scrapes
5A relatively larger size chips or scrapes
5B relatively smaller size chips or scrapes
6 discharge duct
7 cutting fluid
8 cutting fluid tank
9 rail
spiral conveyor
filter unit
21 extension tray
22 tray-side attachment plate
23 duct-side attachment plate
primary filter structure
31 tray-side vertical plate
32 duct-side vertical plate
33 filter frame
34 spacer
bolt
36 through hole for bolt
37 perforated metal plate (primary filter)
38 opening
39 guide plate
secondary filter structure
41 free roller (free-rotating roller)
42 rotary plate
43 mesh filter (secondary filter)
44 screw
45 bolt
46 vane
47 direction of rotation of rotary plate and mesh filter
50 washing nozzle
51 washing liquid pipe
52 washing liquid (cutting fluid)

The invention claimed is:

1. A spiral conveyor comprising:
 a tray into which chips or scrapes discharged from a cutting machine are thrown together with cutting fluid,
 a discharge duct for discharging the chips or scrapes,
 a filter unit connected between the tray and the discharge duct,
 a conveyance spiral mounted within the tray and the filter unit and driven in a predetermined rotating direction for conveying the chips or scrapes in a predetermined direction, and
 a cutting fluid tank for receiving the cutting fluid falling down from the tray and the filter unit,
 wherein the filter unit comprises
  a primary filter fixed at a position close to an outer periphery of the conveyance spiral,
  a secondary filter rotating on the outside of the conveyance spiral and the primary filter, the primary filter comprising a pair of filter members, each having a more rough texture than the secondary filter and being arranged on opposite sides of the conveyance spiral with small qaps between the filter unit and the outer periphery of the conveyance spiral, and
  a washing nozzle for spraying washing liquid onto the secondary filter, wherein the chips or scrapes captured by the primary filter is scraped by the rotating conveyance spiral and delivered back to a conveyance path, whereas the chips or scrapes passing through the primary filter and captured by the secondary filter are removed by the washing nozzles and delivered back to the conveyance path.

2. The spiral conveyor defined in claim 1, wherein the primary filter comprises a perforated metal and the secondary filter comprises a net of 100-200 mesh.

3. The spiral conveyor defined in claim 1, wherein the secondary filter includes plural filter members secured to a ring-shaped rotating disc and free-rotating rollers are positioned in contact with an inner periphery of the rotating disc, so that the secondary filter becomes rotatable.

4. The spiral conveyor defined in claim 1, further comprising one or more vanes provided on an outer periphery of the secondary filter for receiving the washing liquid sprayed from the washing nozzles to rotate the secondary filter in a predetermined direction.

5. The spiral conveyor defined in claim 4, wherein the washing nozzles are arranged substantially just above the secondary filter to spray the washing liquid toward a top of the secondary filter in an obliquely downward direction.

6. The spiral conveyor defined in claim 1, wherein the filter unit is mounted continuously and integrally with an exit of the tray.

7. The spiral conveyor defined in claim 1, wherein the filter unit is an independent unit mounted between an exit of the tray and an entrance of the discharge duct.

* * * * *